April 9, 1968     A. L. MESCHER     3,376,855
ANIMAL CONTROL DEVICE
Filed June 13, 1966
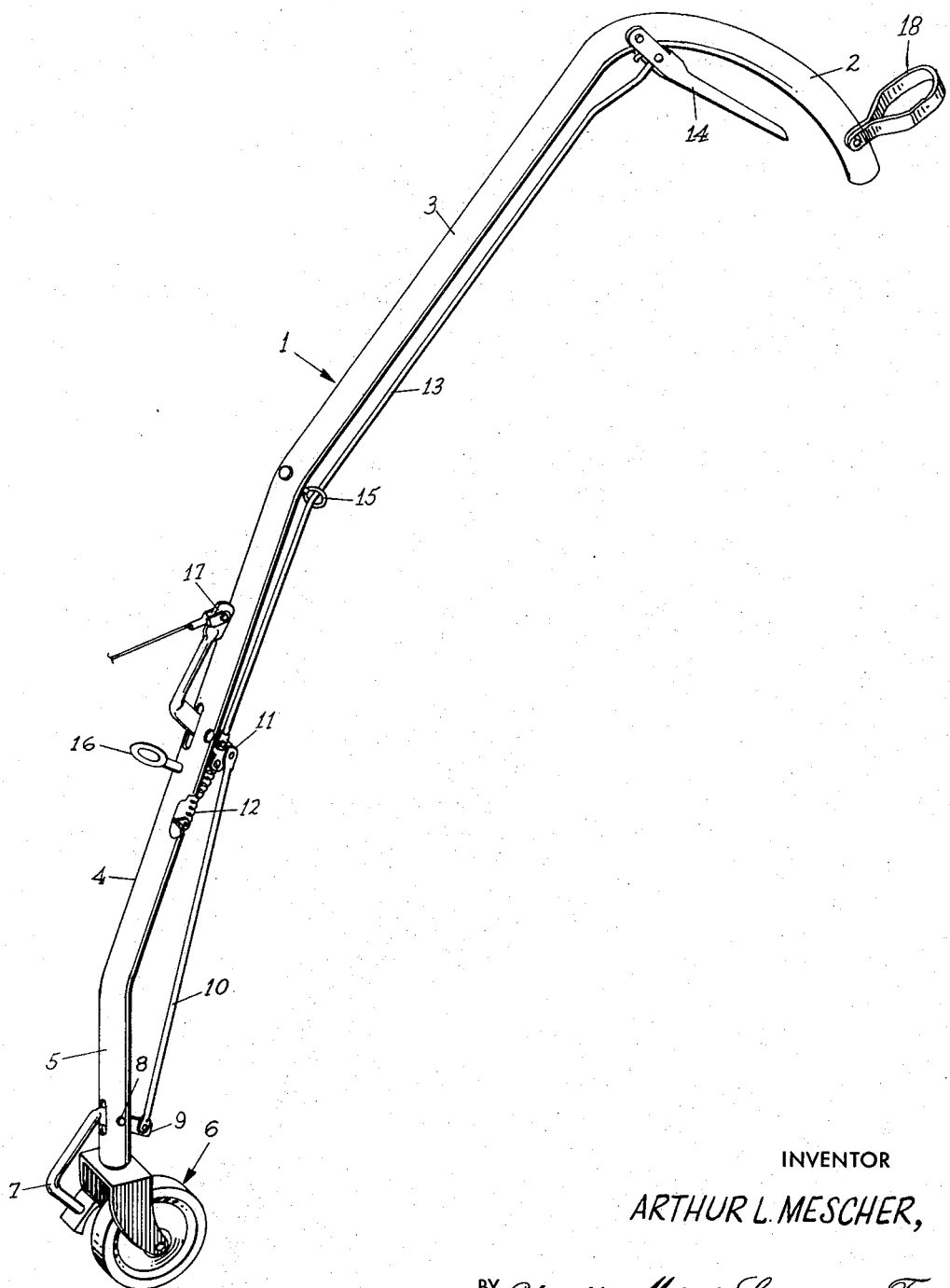
INVENTOR
ARTHUR L. MESCHER,
BY *Yungblut, Melville, Strasser and Foster*
ATTORNEYS

3,376,855
ANIMAL CONTROL DEVICE
Arthur L. Mescher, R.D. 1, Box 3, Minster, Ohio 45865
Filed June 13, 1966, Ser. No. 557,127
5 Claims. (Cl. 119—29)

This invention is directed to a control, restraining and training device for use on animals. And while it may find particular utility in the control, restraining and training of dogs, the device can readily be adapted for use on other four-legged animals. Though not to be deemed a limitation of this invention, the description to follow will for convenience be presented in conjunction with use on a dog.

The devices heretofore used in the obedience training of dogs have ranged from the rigid harness types to the simple leash—all of which brought problems to the trainer. It is therefore a primary object of this invention to combine the freedom of the leash with the control of the more rigid devices.

A further object of this invention is the provision of a safe and efficient means for controlling an animal during a walk.

Another object of this invention is the provision of automatic braking thereby preventing any sudden lunging by the dog.

Further advantages and objects will become apparent to those skilled in the art upon reading the description hereinafter in view of the drawing wherein:

The figure is a perspective view of the animal and restraining device of the instant invention.

Briefly, the training device made in accordance with the instant invention is cane-shaped and carried in much the same manner as a cane. It is light weight yet durable enough to prevent a large dog from lunging from the trainer. While a straight shaft may be used, there are distinct advantages to providing a crook in the shaft of the cane—the resulting shape taking on the appearance of a bow. A handle is provided at one end with a wheel or caster at the opposite end. At the latter end is a brake which is automatically actuated by the sudden movement of the dog or by a separate lever at the direction of the trainer. Each of said braking means are connected to the brake through a common bell crank pivotally mounted on the cane shaft about midway between the ends. Thus, movement of either the dog, or lever adjacent to the handle, will cause the bell crank to pivot thereby resulting in the brake acting against the wheel. Through the foregoing means, the dog may be slowed or halted if desired.

Turning now to the training device as illustrated by the figure, it will be observed that the device is essentially cane-shaped. The training device comprises a shaft 1 made up of handle 2 and body portions 3, 4 and 5. While it may be preferable to utilize continuous bow-shaped body portions, it has been found highly desirable to have the end or body portion angled from the others as illustrated. It has been found that this helps to minimize the force required by the trainer to hold the device to the ground. Further, there is less chance for the device to be suddenly kicked under the trainer.

On end portion 5 is wheel 6, which may be a caster rotatable on the axis of end portion 5, or merely affixed by means of a pin, not shown. Just above the wheel 6 is brake 7, pivotally mounted by means of a pin 8 on end portion 5. The brake is brought into contact with wheel 6 by rotating arm 9 upward. This rotation is effected through arm 10 joining one end of an L-shaped member 11 or bell crank, with brake arm 9. The L-shaped member is pivotally mounted at about the midpoint of one arm to body portion 4. To facilitate releasing of the brake, spring 12 is provided to counteract the braking action.

As another means to effect the braking action, connecting member 13 joining lever 14 with L-shaped member 11 is provided. Guide 15 may be added to help maintain alignment of the connecting member. This unique arrangement gives to the trainer the means to control the dog or other four legged animal by the use of only a single hand. Prior art devices require a double action—one to hold the device, the second to grip the restraining means.

Where it is desirable to control the animal solely by the trainer and not by the animal's movement, a ring or eye 16 is affixed to body portion 4. For the more normal and automatic braking operation, the animal's leash is connected to arm end 17 of L-shaped member 11.

As an optional safety feature, a wrist strap 18 is provided for use with the handle 2 in maintaining firm control of the training device. The trainer merely slips his hand through the strap before gripping the handle. This gives added protection.

Having thus described the invention, it should be apparent that as one walks with the dog or other four legged animal, the animal's freedom is limited only by the length of the leash. The device freely rides along the ground. If by chance the animal were caused to lunge forward, L-shaped member 11 would rotate transmitting its action to brake 9, which contacts wheel 6 and brings to a stop the further movement of the device, and hence the animal. The same action can readily be accomplished by squeezing the lever 14 towards the handle.

It should now be apparent that further modifications may be made in this device without departing from the spirit of the invention. Thus no limitation is intended to be imposed on this invention except those present in the appended claims.

The embodiments of the invention in which an exclusive property or privilege is claimed are defined as follows:

1. An animal control and restraining device comprising:
    (a) an elongated member turned at one end,
    (b) a wheel rotatably mounted on the opposite end,
    (c) brake means pivotally mounted to said elongated member and operative to stop rotation of said wheel,
    (d) an L-shaped member pivotally mounted to said elongated member intermediate the ends,
    (e) means capable of transmitting motion between said L-shaped member and said brake means,
    (f) a spring biasing said last named means thereby rendering the brake inoperative during the normal period of use of said device,
    (g) handle means operatively connected to said elongated member to cause pivoting of said L-shaped member resulting in contact between said brake and said wheel, and
    (h) means on one leg of said L-shaped member adapted to be connected with a leash, whereby a sudden pull thereon by an animal connected to the leash will move said brake into engagement with said wheel to stop rotation of same.

2. The device claimed in claim 1 where the wheel is a caster and rotatable about an axis of said elongated member.

3. The device claimed in claim 1 where the elongated member is bowed in a plane common with the turned end.

4. The device claimed in claim 3 where the curved end is a cane-like handle.

5. The device claimed in claim 4 including a looped safety strap connected to said handle.

References Cited

UNITED STATES PATENTS

| 1,207,648 | 12/1916 | Smith | 46—220 |
| 2,741,031 | 4/1956 | Martin et al. | 33—141 |
| 3,244,149 | 4/1966 | Bosko et al. | 119—29 |

HUGH R. CHAMBLEE, *Primary Examiner.*